Patented Jan. 9, 1923.

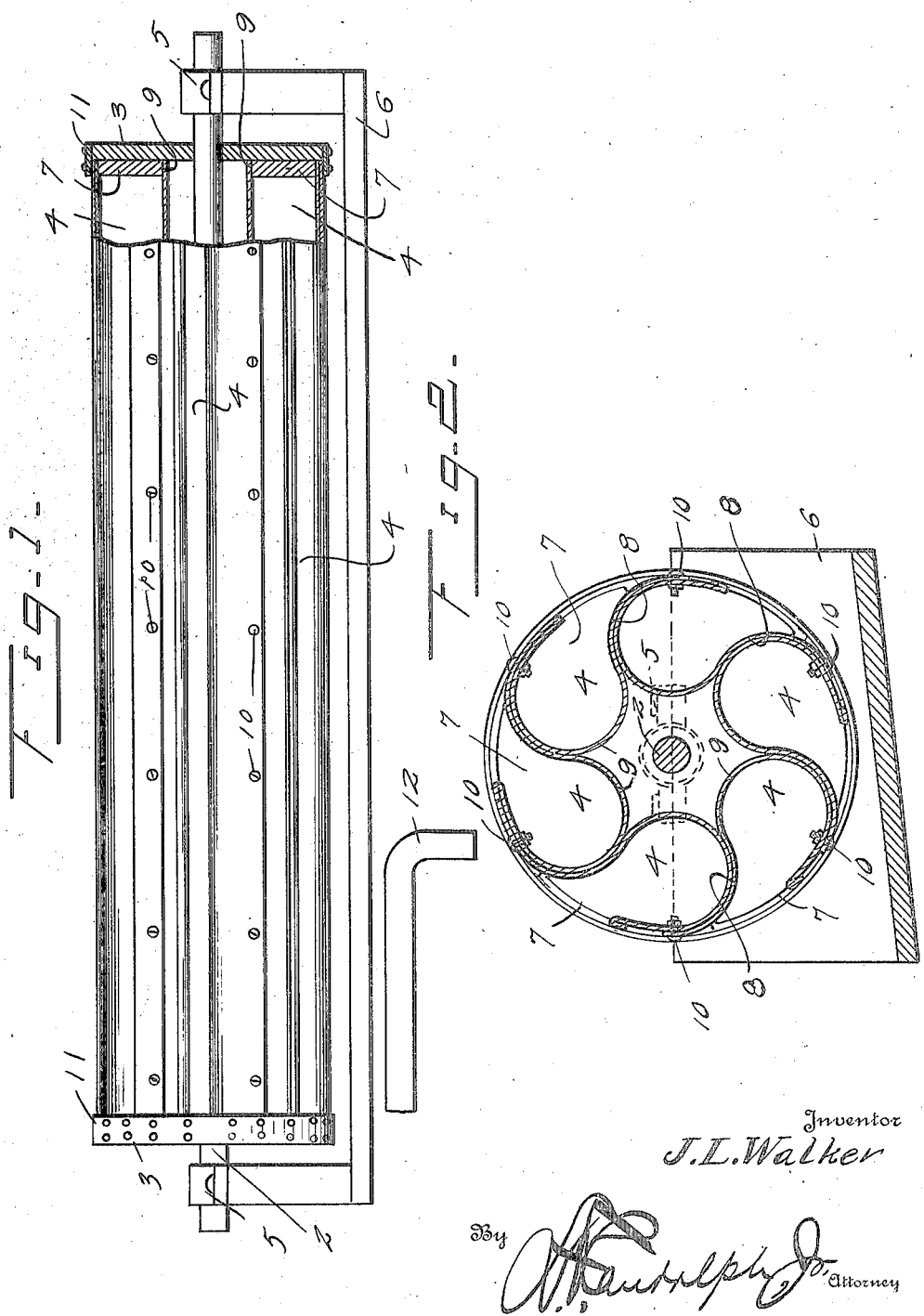

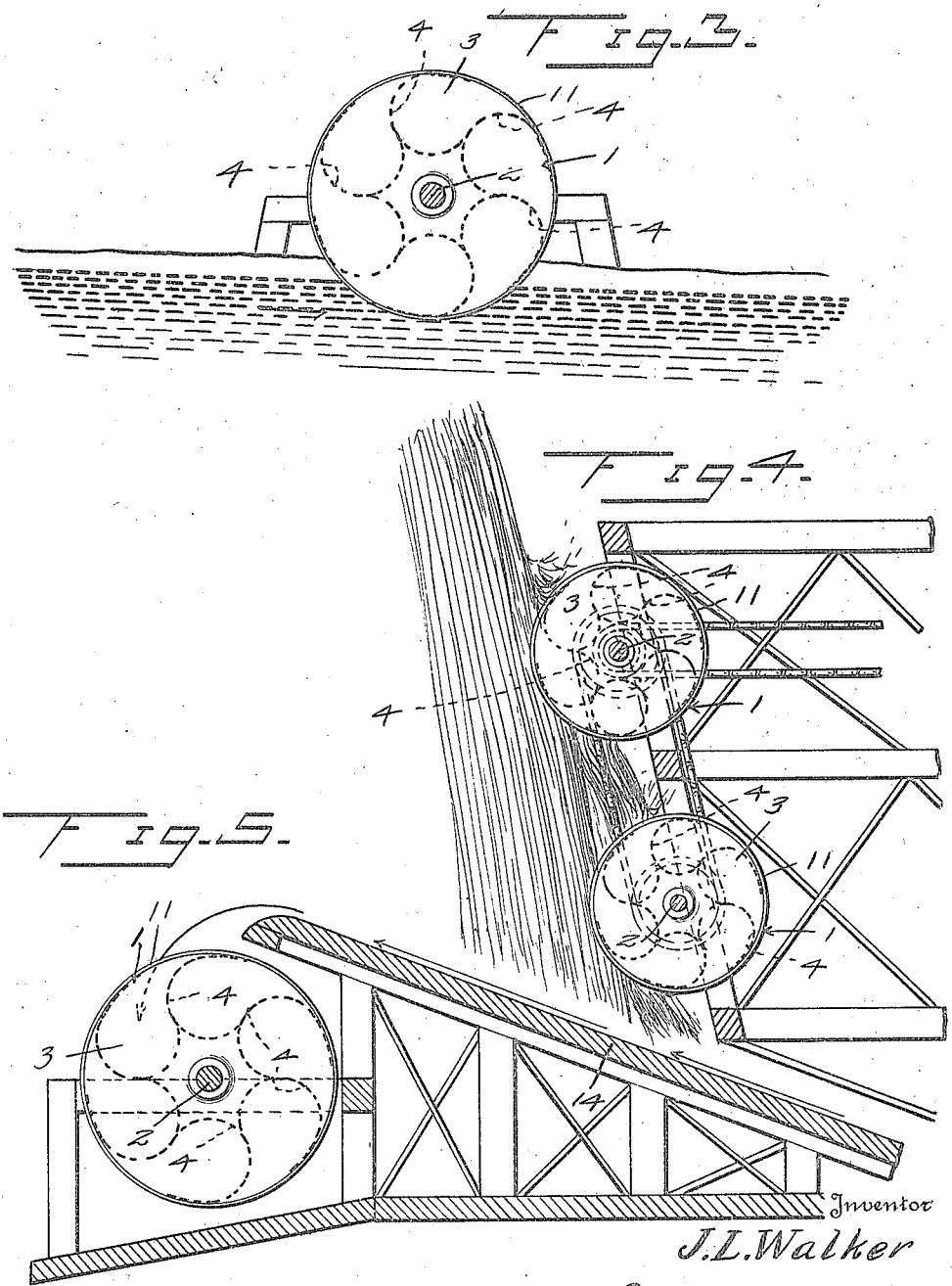

1,441,955

UNITED STATES PATENT OFFICE.

JAMES L. WALKER, OF SANDY, UTAH.

WATER MOTOR.

Application filed May 26, 1921. Serial No. 472,880.

*To all whom it may concern:*

Be it known that I, JAMES L. WALKER, a citizen of the United States, residing at Sandy, in the county of Salt Lake and State of Utah, have invented certain new and useful Improvements in Water Motors; and I do hereby declare the following to be a full, clear, and exact description of the invention, such as will enable others skilled in the art to which it appertains to make and use the same.

This invention relates to new and useful improvements in water motors adapted for use in connection with bodies of water of different kinds and has for its primary object the provision of elongated troughs or buckets arranged circularly about a supporting and power delivering shaft so as to develop a large driving power from a comparatively small water fall and also permits the use of the device in a sluggish stream or with waves of a body of water as a propelling medium.

Another object of this invention is the provision of a water motor of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a water motor constructed in accordance with my invention, Figure 2 is a transverse sectional view illustrating the trough and water fed thereto by a pipe or run, Figure 3 is an end view illustrating the device operating in a stream, Figure 4 is a similar view illustrating a plurality of motors operated by a water fall, Figure 5 is a view illustrating the device operated by the waves of a body of water.

Referring in detail to the drawing, the numeral 1 indicates as an entirety a water motor which includes a supporting and power delivering shaft 2 having adjacent each end disks or circular plates 3 to which elongated troughs or buckets 4 are connected. The troughs or buckets are arranged circularly about the shaft 2 and the latter is rotatably supported in bearings 5 carried by a suitable structure 6.

The opposing faces of the disks or plates 3 have secured thereto spacing elements 7 that have concaved faces 8 merging into convex faces 9. The convex faces 9 are disposed opposite to the concaved faces 8. The spacing elements are adapted to form supports or attaching means for the troughs or buckets to the disks or plates 3 and each trough is constructed from a single length of material or sheet metal which has its end edges secured to the concaved faces 8 of a pair of spacing members 7 and said strip of material follows out the curvature of each face of the spacing members 7 and is extended at one end to engage the strip of material forming the adjacent bucket and is detachably secured to the latter by means of removable fasteners 10. Binding strips 11 are secured to the peripheries of the disks 3 and project over the ends of the buckets or troughs 4 and also the spacing elements 7 to prevent the strips of material from which the troughs are constructed from becoming detached from the spacing members 7.

The supporting and power delivering shaft 2 may be connected to other machinery for the purpose of propelling the same in any suitable manner.

As shown in Figure 2 the buckets are fed with water from a pipe or run 12 and as each bucket becomes filled with water from the pipe or run, the weight of the water in the respective trough causes said trough to move downwardly consequently rotating the shaft 2 and after a certain movement the water within the respective trough empties therefrom while the next trough is moving downwardly under the influence of the water therein.

In Figure 3 is shown the water motor partly submerged in a stream of water so that the buckets disposed lowermost will be compelled to move in the direction of the flow of the stream and consequently rotate the shaft. The troughs or buckets being of elongated formation provide a comparatively large area for the water to strike against and consequently permit a large amount of power to be developed from a sluggish stream.

In Figure 4, a plurality of motors are shown operating in conjunction with a fall and the motors are arranged one above the other so that the water of the fall strikes the upper most motor and operates the same and the water discharged from the uppermost motor falls onto the next trough and so on from one motor to the other. The shafts of the various motors are connected in any suitable manner to a common power delivery shaft for operating machinery. With this arrangement a great number of horsepower may be developed from a comparatively small water fall.

In Figure 5 the motor is shown in conjunction with a support 14 which is so shaped as to cause the waves of a body of water to rise or be thrown upwardly onto the motor and thereby fill the troughs or buckets thereof causing a rotation of the shaft for said motor.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A water motor comprising a supporting and power delivering shaft, disks secured to said shaft, spacing elements secured to the opposing faces of said disks, and a plurality of elongated buckets carried by said disks and spacing members.

2. A water motor comprising a supporting and power delivering shaft, disks secured to said shaft, spacing members secured to the opposing faces of the disks and having convexed and concaved faces, strips of sheet metal secured to the faces of said spacing members and to each other to form relatively spaced elongated buckets.

3. A water motor comprising a supporting and power delivering shaft, disks secured to said shaft, spacing members secured to the opposing faces of the disks and having concaved and convexed faces, strips of material secured to said faces of said spacing members and having one of their edges detachably secured to the adjacent strip to form a plurality of relatively spaced elongated buckets, and binding strips secured to said disks and overlying the end edges of the material forming said buckets.

4. A water motor comprising a supporting and power delivering shaft, disks secured to said shaft, spacing elements secured to the opposing faces of said disks, a plurality of elongated buckets carried by said disks and spacing members and said buckets having their longitudinal edges overlapping and secured together.

5. A water motor comprising a supporting and power delivering shaft, disks secured to said shaft, a plurality of strips of sheet metal secured to the opposing faces of said disk and to each other to form relatively spaced elongated buckets.

6. A water motor comprising a supporting and power delivering shaft, disks secured to said shaft, a plurality of elongated buckets carried by said disks, and having overlapping edges, and means securing said overlapping edges together.

In testimony whereof I affix my signature in presence of two witnesses.

JAMES L. WALKER.

Witnesses:
H. VAN DAM, Jr.,
D. M. DRAPER.